Feb. 22, 1949.　　　L. C. McHENRY　　　2,462,655
SPEED INDICATING DEVICE
Filed June 19, 1946

INVENTOR
LOREN C. MC HENRY

BY *John H. Cassidy*

ATTORNEY

Patented Feb. 22, 1949

2,462,655

UNITED STATES PATENT OFFICE 2,462,655

SPEED INDICATING DEVICE

Loren C. McHenry, Rivermines, Mo.

Application June 19, 1946, Serial No. 677,699

2 Claims. (Cl. 177—311)

This invention relates to a speed indicating device, and more particularly to a device of a character which will give a signal when a machine supervised by the device falls below a predetermined normal speed.

An object of the invention is to provide a device which is simple in construction, economical to manufacture, efficient in operation, and as free as possible from operating and maintenance difficulties.

A further object of the invention is to produce such a device which will have the smallest number of moving parts.

Other objects will be apparent from the following detail description, taken in connection with the accompanying drawings.

Figure 1:
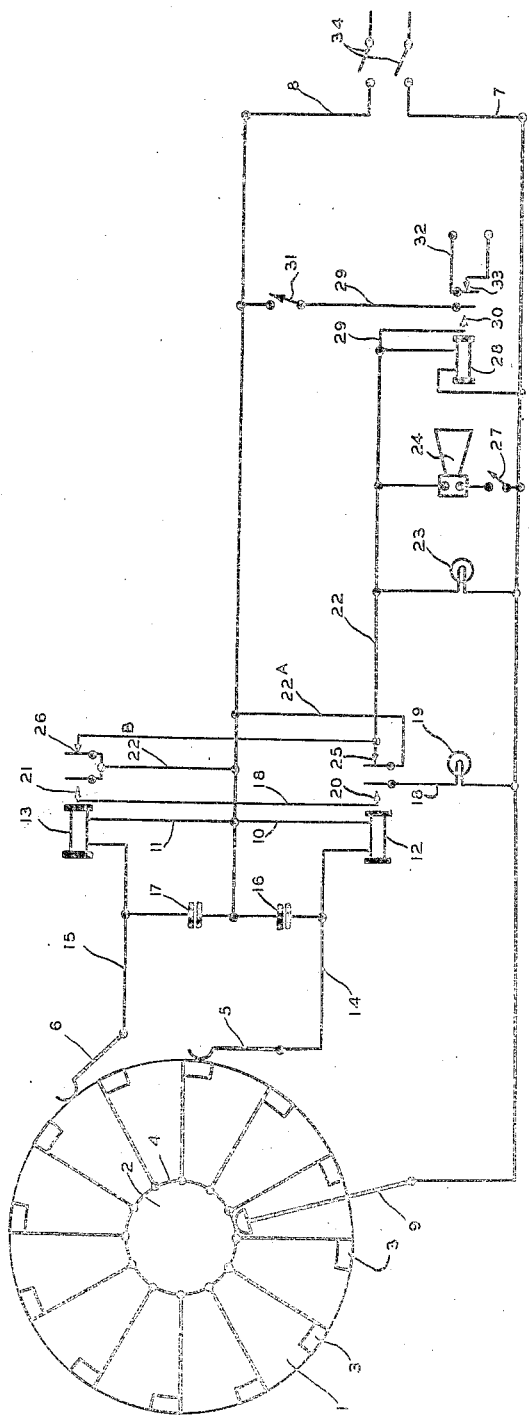
Fig. 1 is a diagram showing a preferred embodiment of my invention.

In accordance with this invention a pulsator mechanically connected to and operating in synchronism with a machine is arranged to make and break an electric circuit in which there is a relay controlling a signal circuit. A condenser is connected in the first mentioned circuit in parallel with the relay and is so proportioned as to keep the relay energized when the pulsator and therefore the machine is operating at normal speed but permitting the relay to become deenergized when the speed drops below normal.

In the preferred embodiment the pulsator is shown in the form of a commutator 1 which is driven by a shaft 2. This shaft is mechanically connected to an appropriate rotating shaft of the machine to be supervised. The shaft 2 may in fact be integral with or an elongation of such a machine shaft. For example, the shaft may be the tail pulley shaft of a belt conveyor.

The commutator 1 has a plurality of electrical conductive segments 3 equi-spaced about the periphery of the commutator and electrically connected to a slip ring 4. The commutator is swept by a pair of brushes 5 and 6, so arranged with reference to the spacing of the segments 3 that one of them will be in contact with a segment 3 while the other is on a non-conductive portion of the commutator.

The system is fed by a circuit which includes the leads 7 and 8. The lead 7, as specifically shown in the diagram, is connected to a brush 9 in contact with the slip ring 4. The lead 8 has branches 10 and 11 leading respectively to relays 12 and 13, which are connected respectively to the brushes 5 and 6 by the lines 14 and 15.

Condensers 16 and 17 are connected in parallel respectively with the relays 12 and 13, and have such a capacity with respect to the inductiveness of the coils in their relays that they will keep the relays energized while the commutator 1 is moving at a normal rate of speed, but will permit the relays to become deenergized if the speed drops below a predetermined normal.

It will now be understood that a circuit, or circuits, can be controlled by the relays so that they will cause a signal to be given when the relays are deenergized, as they will be when the speed drops below normal. One such signalling circuit 18 is illustrated as including a lamp 19 and is controlled in series by the relays 12 and 13. That is to say, the circuit 18 includes a contact 20 of the relay 12 and a contact 21 of the relay 13. These contacts are so arranged on their relays that they will be closed when the relays are energized. Therefore, when the machine to be supervised and the commutator 1 is rotating at normal speed both contacts 20 and 21 will be closed giving a steady light in the lamp 19. If either relay 12 or 13 becomes deenergized the circuit 18 will be broken momentarily causing the light 19 to flicker.

A second signalling circuit 22 is shown as feeding in parallel a lamp 23 and a horn 24. This circuit 22 by branches 22a and 22b is arranged to be closed when either relay 12 or 13 is collapsed. The branch 22a connects through a contact 25 of the relay 12, and the branch 22b connects through a contact 26 of the relay 13.

It may now be further understood that upon a sub-normal speed one or both the contacts 25 and 26 will be closed, due to the collapse of the respective relays 12 and 13, thereby closing the circuit 22 to give a visible signal through the lamp 23 or an audible signal through the horn 24. It will be understood that either the visible signal, the lamp 23, or the audible signal, the horn 24, may be used; or both may be employed if desired.

For convenience a switch 27 is employed to control the horn 24. Thus, if a signal has been received from the horn 24 and is understood the switch 27 may be opened to prevent noise and confusion. Furthermore the switch 27 may be allowed to remain open upon starting the superimposed machine until the machine is brought up to normal speed.

A holding relay 28 may be employed in the circuit 22 and supplied by a self-locking circuit 29 closed automatically by a contact 30 of the relay 28. Thus when either the relays 12 and 13 are momentarily deenergized to close the contacts 25 and 26, the relay 28 will be energized closing its contact 30, thereby causing a continuous flow of current in the circuit 22. A switch 31 in the holding circuit 29 can be used to control that circuit. It will be obvious that the use of the holding relay 28 and its self-locking circuit serves to give a continuous signal through the lamp 23 or the horn 24, whenever the speed drops below normal even if momentarily. It will be seen, however, that the signals will be effective without the use of such holding relay but the signals will be intermittent rather than continuous.

An auxiliary circuit 32 may be arranged to be controlled by the relay 28 through a contact 33 for any purpose desired, such as for motor control.

As illustrated in the diagram a switch 34 may be used to control the supply circuit through the leads 7 and 8, so that the device may be electrically disconnected when not in use. Any convenient source of electrical supply may be employed and it has been found that the usual 110 volt cycle A. C. current may be satisfactory, as well as a direct current of any common voltage.

It will be apparent that the device is operative with only one brush, 5 or 6, to produce a limited result. Two brushes are employed, however, to avoid a false signal when the commutator is at rest. Thus, if only one brush 5 were employed and the commutator were to stop suddenly in the position shown in the drawing, the relay 12 would be energized and no correct signal would be given.

Figure 2:
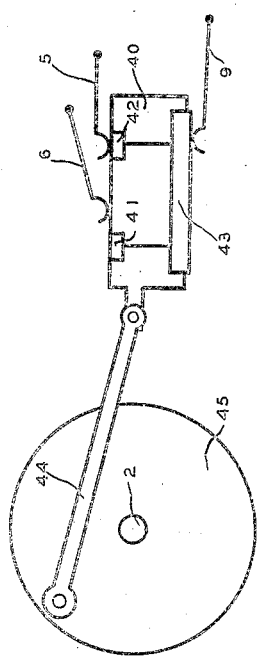
Fig. 2 is a diagrammatic view showing a modification.

An alternate form of pulsator is shown in Fig. 2. In this embodiment a reciprocating member 40 is employed, having spaced segments 41 and 42 connected in common to a conductor 43 which is wiped by a brush 9, similarly as the brush 9 makes contact with the slip ring 4 on the commutator 1. The brushes 5 and 6 make contact with the segments 41 and 42, and comparable to the contact made by the brushes 5 and 6 in the preceding embodiment with the segments 3 on the commutator. A sliding member 40 is connected by a pitman 44 to a crank wheel 45 connected to the shaft 2.

It will be apparent from the foregoing description that the invention accomplishes its objects. A device has been supplied which will be efficient, and which is simple in construction and economical to manufacture. Few moving parts are employed. The device is largely electrical and employs inexpensive standard electrical parts, such as relays and condensers. These parts, and all the parts of the device are such as to have a long life and to be relatively free from trouble during operation. In case of repair, such repair entails merely the substitution of inexpensive new parts for those which have become worn or ineffective.

Various changes may be made in the details of construction, within the scope of the appended claims, without departing from the spirit of this invention.

It has already been pointed out that several signal circuits are employed, and it will be obvious that all of these need not be employed.

While a preferred method of applying the invention has been illustrated and described, parts of this invention may be used to advantage without the whole, and additions and improvements may be made while retaining the fruits of the invention.

I claim:

1. Means indicating subnormal speed of a machine comprising a movable device having a plurality of electrical contact segments thereon mechanically connected and driven in synchronism with said machine, brushes positioned to alternately make and break contact with said segments as said device is moved, circuits connected to said brushes respectively, and controlled by said segments, relays connected in and energized by said circuits, condensers connected in the circuits, respectively, in parallel with said relays and proportioned to keep said relays energized when said machine is moving at normal speed but permitting said relays to become deenergized when said speed drops below normal, a circuit controlled by the relays, and a signaling device controlled by said circuit.

2. Means for indicating subnormal speed of a machine comprising a commutator having equispaced contact segments mechanically connected and driven in synchronism with a machine to be controlled, a slip ring electrically connected to the contact segments, brushes positioned to alternately make and break contact with said segments as said commutator is rotated, circuits connected to said brushes respectively, and controlled by said circuits, relays connected in and energized by said circuits, condensers connected in the circuits respectively in parallel with the relays and proportioned to keep the relays energized when said commutator is being rotated at normal speed but permitting them to become deenergized when said speed drops below normal, a signal circuit parallel controlled by said relays to close the circuit when the relays are deenergized, a warning device controlled by said circuit, and a holding relay, with a self-locking circuit, in and for said signal circuit arranged whereby a constant signal is given by said warning device after the signal circuit has been once closed by either of said first mentioned relays.

LOREN C. McHENRY.

REFERENCES CITED

The following references are of record in the file of this patent:

UNITED STATES PATENTS

| Number | Name | Date |
|---|---|---|
| 1,571,960 | Needham | Feb. 9, 1926 |
| 2,008,912 | Hudd | July 23, 1935 |
| 2,130,453 | Bone | Sept. 20, 1938 |
| 2,333,210 | Stern | Nov. 2, 1943 |
| 2,337,132 | Shaw | Dec. 21, 1943 |
| 2,349,182 | Lesnick | May 16, 1944 |

FOREIGN PATENTS

| Number | Country | Date |
|---|---|---|
| 572,018 | Germany | Mar. 9, 1933 |